United States Patent [19]

Sohar et al.

[11] 3,894,027
[45] July 8, 1975

[54] RESOLUTION OF RACEMIC RETICULINE AND RACEMIZATION OF ITS ENANTIOMERS

[75] Inventors: Paul Sohar, Warren; Erwin F. Schoenewaldt, Watchung, both of N.J.

[73] Assignee: Merck & Co., Inc., Rahway, N.J.

[22] Filed: July 31, 1973

[21] Appl. No.: 384,185

[52] U.S. Cl.......... 260/286 R; 260/285; 260/289 A; 260/DIG. 7; 260/DIG. 8
[51] Int. Cl............................................. C07d 33/32
[58] Field of Search ............................... 260/286 R

[56] References Cited
OTHER PUBLICATIONS

Morrison and Boyd, "Organic Chemistry," 1966, pp. 231–232.

March, "Advanced Organic Chemistry," 1968, p. 91.

*Primary Examiner*—Donald G. Daus
*Assistant Examiner*—David E. Wheeler
*Attorney, Agent, or Firm*—Mario A. Monaco; Harry E. Westlake, Jr.

[57] ABSTRACT

Racemic reticuline is resolved by forming a crystalline diastereomeric acid salt with a mandelic acid enantiomer. The reticuline enantiomers are racemized by treatment with a reduced noble metal or noble metal oxide catalyst. (−)-Reticuline is a valuable intermediate useful in the synthesis of thebaine, and (+)-reticuline is useful as a precursor of pallidine, sinoacutine, coreximine, and the berberine alkaloids.

14 Claims, No Drawings

RESOLUTION OF RACEMIC RETICULINE AND RACEMIZATION OF ITS ENANTIOMERS

BACKGROUND OF (+INVENTION (+)-Salutaridine can be converted to the alkaloid thebaine in accordance with processes known in the art. A process for the conversion of (−)-reticuline to (+)-salutaridine by reacting the reticuline with an oxidative phenolic coupling enzyme produced by growing strains of *Schizomycetes* or *Eumycetes* in an aqueous nutrient medium is described in the pending application of Erwin F. Schoenewaldt and Ernel D. Ihnen, U.S. Ser. No. 331,394 filed Feb. 12, 1973. Racemic reticuline can be prepared in accordance with processes known in the art. However, heretofore no method of resolving racemic reticuline has been reported in the literature. The only reported resolution in this series is that of Battersby et al., J. Chem. Soc., 3323, (1965), who succeeded in resolving the dibenzyl ether of (±)-reticuline to obtain (−)-O,O-dibenzylreticuline from which (−)-reticuline could be obtained by hydrolysis with acid. Since this method involves benzylation and debenzylation steps in addition to the resolution step, other methods more suitable for the preparation of (−)-reticuline on a commerical scale have been sought.

In addition, no method for the racemization of reticuline enantiomers was known in the art. Previously, Kametani et al. [J. Chem. Soc. C, 1619, (1968)] racemized certain benzyl tetrahydroisoquinolines with hydrogen in the presence of platinum oxide catalyst. Attempted application of Kametani's method to the racemization of the dibenzyl ether of reticuline was accompanied by severe degradation of the molecule, including partial debenzylation, leading to an intractable mixture of products unsuitable for further handling.

SUMMARY OF THE INVENTION

It is an object of this invention to provide a method of resolving racemic reticuline suitable for use on a commercial scale. Another object is to provide a method of resolving racemic reticuline directly. A further object is to provide a simple economic process for racemizing the reticuline enantiomers. Other objects will be apparent from the detailed description of this invention hereinafter provided.

DETAILED DESCRIPTION OF THE INVENTION

In accordance with this invention, racemic reticuline is resolved by separating a diastereomeric salt formed by reacting the racemate with a mandelic acid enantiomer. This separation is conveniently accomplished by carrying out the reaction in a suitable solvent medium and seeding the reaction mixture with crystals of the desired diastereomeric mandelic acid salt. The crystalline product so obtained is readily separated from the solution, and the desired reticuline enantiomer is then readily recovered by treating the diastereomer with an alkali and separating the reticuline free base with a suitable solvent. The mandelic acid salts of the reticuline enantiomers are unique since they are crystalline and useful for resolution in contrast to many other salts tested which were not found to be useful for this purpose.

In carrying out the processes of our invention, it is preferred to use as solvent media a solvent system in which the reactants are readily soluble and from which the diastereomeric salts will crystallize. Solvents suitable for this purpose that might be mentioned are acetonitrile, lower aliphatic alcohols such as methanol, ethanol and propanol, esters such as ethylacetate, ketones such as methylethyl ketone, ethers such as dioxane, and mixtures of such solvents. Thus, the resolution is conveniently carried out by reacting equimolar amounts of racemic reticuline and the mandelic acid enantiomer in a solvent medium, adding seed crystals of the desired diastereomeric salt, and allowing the solution to stand for sufficient time to deposit the desired crystalline diastereomeric salt. The temperature for carrying out this process is not critical, but we generally prefer to operate at about room temperature or slightly above. The seed crystals of the diastereomeric salt are conveniently prepared by reacting equimolar quantities of the reticuline and mandelic acid enantiomers in suitable solvent media, such as those mentioned above, and recovering the crystalline diastereomer from the solution.

The reticuline enantiomer is readily recovered from the diastereomeric salt by treating it with an alkali and separating the reticuline free base from the salt of the mandelic acid. This can be readily accomplished by extraction with a suitable solvent for the reticuline free base such as chloroform.

In accordance with a further embodiment of this invention, it is found that the reticuline enantiomer can be racemized by reacting it with a reduced noble or noble metal oxide hydrogenation catalyst. Thus, the racemization is conveniently effected by intimately contacting the reticuline enantiomer in acidic solution with a small amount of pre-reduced catalyst for sufficient time to convert the enantiomer to the racemate; the racemic product being recovered by removing the catalyst and evaporating the solvent to dryness. Alternatively, as will be readily apparent to those skilled in this art, the process can be effected by intimately contacting the reticuline enantiomer with a noble or noble metal oxide catalyst and then treating this mixture with hydrogen. However, when the racemization is effected in a hydrogen atmosphere, we find that hydrogenation by-products are formed which reduce the yield of the racemate and make its isolation more difficult. Therefore, generally we prefer to effect the racemization by contacting the enantiomer with pre-reduced catalyst in a hydrogen-free atmosphere for sufficient time to complete the formation of the racemate.

The following examples illustrate the several embodiments of this invention.

EXAMPLE 1

To a warm solution of 18 g. of (±)-reticuline in 200 ml. of acetonitrile is added a solution of 8.32 g. of (−)-mandelic acid in 70 ml. of acetonitrile. After cooling to room temperature, the clear solution is seeded with (−)-reticuline-(−)mandelate and allowed to crystallize slowly overnight. The resulting white crystals are collected on a funnel, washed with 100 ml. of cold acetonitrile followed by two washes with 50 ml. of ether. The solid product is dried to constant weight to afford 8.71 g. of the mandelate salt; m.p. 115°–120°C. $[\alpha]_D = -130.8 \pm 0.4$ (C = 1 in chloroform).

A chloroform solution of this mandelate salt is washed with 5% aqueous sodium bicarbonate solution. The chloroform solution is dried over anhydrous sodium sulfate and concentrated to dryness to give 6.2 g.

of (−)-reticuline as a glassy foam; $[\alpha]_D = -53.8 \pm 0.7$ (C = 1 in CHCl$_3$). Converted to HCl salt, $[\alpha]_D = -80.6 \pm 0.7$ (C = 1 in H$_2$O) corresponded to a reported value of −72 (C = 1 in H$_2$O).

EXAMPLE 2

To a solution of 1.8 g. of (±)-retriculine in 20 ml. of acetonitrile is added a solution of 0.83 g. of (+)-mandelic acid in 7 ml. of acetonitrile, and the resulting solution is seeded with (−)-reticuline-(+)-mandelate salt and allowed to stand overnight. The resulting crystals are collected, washed and air dried to afford 1.07 g. of the (−)-reticuline-(+)-mandelate salt having a melting point of 80°–90°C. After recrystallization from acetonitrile, the recrystallized salt is found to melt at 95°–100°C. and a rotation $[\alpha]_D = -41.0 \pm 0.6$ (C = 1 in CHCl$_3$).

The salt is dissolved in chloroform and washed with 5% aqueous sodium bicarbonate solution. The pure (−)-reticuline so obtained had a rotation $[\alpha]_D = -63.7 \pm 0.8$ (C = 1 in CHCl$_3$), HCl salt, $[\alpha]_D = -85.6 \pm 0.7$ (C = 1 in H$_2$O).

EXAMPLE 3

Following the procedures of Example 1 and 2 and seeding the resulting mixture of the racemic reticuline and mandelic acid with (+)-reticuline-(+)-mandelate or (+)-reticuline-(−)mandelate salt, the corresponding (+)-reticuline salts are obtained. The mandelate salts are then dissolved in chloroform, extracted with aqueous sodium bicarbonate solution, and the dried chloroform extracts are evaporated to afford (+)-reticuline.

EXAMPLE 4

The combined mother liquors and washes from the resolution described in Example 1 are concentrated to dryness and converted to the free base in chloroform by extractions with sodium bicarbonate solution. The recovered reticuline consisting primarily of the (+) isomer is dissolved in 600 ml. of ethanol containing 3.1 ml. of concentrated hydrochloric acid and 12.1 g. of Bishop platinum oxide catalyst is reacted under 5 psi of hydrogen with shaking for 1 day. The resulting reaction mixture is optically inactive. The racemic reticuline is isolated by filtering the reaction mixture, concentrating the filtrate, neutralizing with sodium bicarbonate and extracting with chloroform to recover the crude racemic reticuline which is purified by recrystallization from acetonitrile.

EXAMPLE 5

Proceeding as described in Example 4, the mother liquors and washes obtained in Example 2 are racemized to obtain racemic reticuline. In the same way, the mother liquors and washes containing predominantly (−)-reticuline and obtained from the processes described in Example 3 can be racemized to afford the racemate.

EXAMPLE 6

A suspension of 0.4 g. of Bishop platinum oxide catalyst in 20 ml. of ethanol is pre-reduced with hydrogen for one-half hour. The system is then well purged with nitrogen, and a solution of 0.4 g. of (+)-reticuline hydrochloride dihydrate is added and the shaking is continued under nitrogen for 2 days. The resulting reaction mixture is optically inactive. After filtration and concentration, the residue is dissolved in water, neutralized with solid sodium bicarbonate, extracted with 3 × 50 ml. of chloroform and crystallized from acetonitrile to afford 0.29 g. of racemic reticuline melting at 139°–142°C.

We claim:

1. The process which comprises the steps of reacting (±)-reticuline with mandelic acid enantiomer in a suitable solvent medium,
   seeding the resulting reaction mixture with a crystalline diastereomeric salt of the enantiomeric acid and a reticuline enantiomer, and
   separating and recovering the crystalline diastereomeric salt of the enantiomeric acid and the reticuline enantiomer corresponding to said seeding crystalline diastereomeric salt.

2. The process of claim 1 in which the crystalline diastereomer is (−)-reticuline-(−)-mandelate.

3. The process of claim 1 in which the crystalline diastereomer is (−)-reticuline-(+)mandelate.

4. The process of claim 1 in which the crystalline diastereomer is (+)-reticuline-(−)mandelate.

5. The process of claim 1 in which the crystalline diastereomer is (+)-reticuline-(+)-mandelate.

6. A salt of a reticuline enantiomer and a mandelic acid enantiomer.

7. (−)-Reticuline-(−)-mandelate.

8. (−)-Reticuline-(+)-mandelate.

9. (+)-Reticuline-(−)-mandelate.

10. (+)-Reticuline-(+)-mandelate.

11. The process according to claim 1 in which the separated crystalline diastereomer is treated with an alkali base and the reticuline enantiomer is recovered.

12. The process of racemizing a reticuline enantiomer or an acid salt thereof which comprises the step of reacting said enantiomer or a salt thereof with a reduced platinum or platinum oxide catalyst.

13. The process according to claim 12 wherein the reticuline free base is reacted.

14. The process of claim 12 wherein the hydrochloride salt of the reticuline enantiomer is reacted.

* * * * *